(12) United States Patent
Bonitz et al.

(10) Patent No.: US 7,412,849 B2
(45) Date of Patent: Aug. 19, 2008

(54) DEVICE FOR BLANK PRESSING OPTICAL GLASS BODIES

(75) Inventors: Ralf Bonitz, Mainz (DE); Rainer Adebahr, Gruenenplan (DE); Polina Ebeling, Mainz (DE); Doris Moseler, Budenheim (DE); Christian Kunert, Mainz-Kastel (DE); Dirk Weidmann, Mainz (DE); Matthias Redey, Spiesheim (DE)

(73) Assignee: Schott AG, Mainz (DE)

( * ) Notice: Subject to any disclaimer, the term of this patent is extended or adjusted under 35 U.S.C. 154(b) by 300 days.

(21) Appl. No.: 10/514,742

(22) PCT Filed: May 27, 2003

(86) PCT No.: PCT/EP03/05540

§ 371 (c)(1),
(2), (4) Date: Nov. 17, 2004

(87) PCT Pub. No.: WO03/099733

PCT Pub. Date: Dec. 4, 2003

(65) Prior Publication Data

US 2005/0229638 A1    Oct. 20, 2005

(30) Foreign Application Priority Data

May 28, 2002    (DE) ................................ 102 23 668

(51) Int. Cl.
*C03B 7/14*    (2006.01)

(52) U.S. Cl. .............................. 65/304; 65/207; 65/302; 65/25.1

(58) Field of Classification Search .................... 65/304, 65/25.1
See application file for complete search history.

(56) References Cited

U.S. PATENT DOCUMENTS

| | | | | |
|---|---|---|---|---|
| 2,676,436 A | * | 4/1954 | Zampieri | ..................... 65/246 |
| 3,961,927 A | * | 6/1976 | Alderson et al. | ............. 65/25.1 |
| 4,819,557 A | | 4/1989 | Handschuher | |
| 5,713,975 A | * | 2/1998 | Schonfeld et al. | ............ 65/25.1 |
| 5,762,673 A | * | 6/1998 | Hirota et al. | ................. 65/25.1 |
| 6,334,335 B1 | | 1/2002 | Hirota et al. | |
| 6,810,686 B2 | * | 11/2004 | Hirota et al. | ................. 65/25.1 |

FOREIGN PATENT DOCUMENTS

| | | |
|---|---|---|
| DE | 24 10 923 A | 9/1974 |
| JP | 1157849 | 6/1989 |
| JP | 6-206730 | 7/1994 |
| JP | 09221330 | 8/1997 |

* cited by examiner

*Primary Examiner*—Philip C Tucker
*Assistant Examiner*—Phu H Nguyen
(74) *Attorney, Agent, or Firm*—Michael J. Striker

(57) ABSTRACT

The device for blank pressing glass bodies includes a first rotary indexing table with preforms for forming parisons from glass gobs; a second rotary indexing table having pressing molds and pressing tools for pressing the parisons into final form after formation in the preforms; and a device for shifting the first rotary indexing table relative to the second rotary indexing table so that each preform is positionable in a transfer position between a pressing tool and a pressing mold. Each preform is mounted on the first rotary indexing table by a indexable mount for holding it in a first horizontal position or in a second position pivoted away from the first position, so that, when a preform is in the transfer position, the indexable mount can be pivoted, so that a parison in it drops into the pressing mold for pressing by the pressing tool.

7 Claims, 3 Drawing Sheets

DEVICE FOR BLANK PRESSING OPTICAL GLASS BODIES

BACKGROUND OF THE INVENTION

The invention relates in the broadest sense to a method for producing blank-pressed glass bodies for optical equipment by preshaping technology, in which a single molten glass gob is delivered to a levitation parison mold, and the glass gob, without touching the parison mold surface, is preformed into a parison, which, after a defined length of time has elapsed, is transferred to a separate press mold and is pressed therein into its final form by means of a press tool. To that end, the parison mold is moved across the press mold for the transfer of the glass gob and is stopped in a transfer position and then pivoted downward, away from the glass gob. The actual invention relates to a device for blank pressing optical glass bodies, which comprises two rotary indexing tables, of which one has circularly disposed parison molds for making the parisons from molten glass gobs, each of which have extremely tiny openings in their lower region for introducing an air cushion, and the other has circularly disposed press molds for pressing the parisons after transfer from the parison molds.

It is known to produce glass bodies for the production of optical equipment, such as lenses, prisms, etc. in highly polished forms, by repressing re-warmed, blank (fire-polished) glass rods. The re-pressing is necessary to attain the final precise surface optical quality for the glass bodies. In producing some glass bodies, such as aspherical lenses for automobile headlights, however, the re-pressing operation alone is insufficient. Milling, grinding and polishing operations are necessary in addition. In producing blank-pressed condenser lenses, for instance, only the aspherical surface is blank-pressed, while the plane face opposite the blank face is milled, ground and polished by mechanical operations.

The manual re-pressing and the additional method steps that may be necessary dictate a time-consuming, expensive mode of production. Since there is a very great need for blank-pressed glass bodies, in particular lenses for automobile headlights, the demand for automatic production directly from the molten phase of the glass, that is, after an in-line blank pressing process, arises.

This kind of automatic production is possible by means of the preshaping technology defined at the outset, which is known for instance from German Patent Disclosure DE-A 24 10 923. The transfer of the glass gob from a parison mold is affected according to this reference by placing the glass gob on a kind of chute along which the parison is guided in the hot state to a pressing mold. This causes surface defects and changes of shape, which are currently no longer tolerable. The change in shape furthermore leads in the final analysis to an uneven temperature distribution. This too has an adverse effect on shaping in the ensuing pressing operation.

In Japanese Patent Disclosure JP-A 11-157 849, a method of the above-described kind has been disclosed. In it, the transfer of the glass gob from a parison mold is accomplished by opening the parison mold and causing the glass gob to drop into a press mold in free fall. This avoids surface defects and changes of shape. However, there is no way to tell how the interaction of the parison mold and the press mold proceeds.

Further methods in this field are known from Japanese Patent Disclosure JP-A 06 206 730 and U.S. Pat. No. 5,762,673.

SUMMARY OF THE INVENTION

Against this background, it is now the object of the present invention to refine the generic method of the above-described type for pressing optical glass bodies such that the transfer of the glass gob from the parison mold into the press mold is performed as effectively as possible. With respect to the device of the above-described type for pressing optical glass bodies, it is the object of the present invention to refine the device so that transfer of the glass gob from the parison mold into the press mold is performed as effectively as possible.

According to the invention the device for blank pressing glass bodies for optical equipment, such as a lens, by preshaping technology, comprises a first rotary indexing table comprising a plurality of levitation parison molds in a circular arrangement thereon, each of which comprises means for preshaping a respective molten glass gob delivered thereto into a corresponding parison and having a lower region provided with a plurality of openings for forming an air cushion, so that the molten glass gob and the parison formed therefrom do not contact any surfaces of the parison molds;

a second rotary indexing table comprising a plurality of respective pressing molds and corresponding pressing tools arranged in a circular arrangement thereon, wherein the pressing tools have drive means for pressing the parisons arranged in the pressing molds into a final form after formation and transfer of the parisons to the pressing molds; and means for shifting the first rotary indexing table relative to the second rotary indexing table so that each parison mold is positionable in a transfer position between a press tool and a press mold after a predetermined time interval for parison formation;

wherein each parison mold is mounted on the first rotary indexing table by an indexable mount for keeping the respective parison mold associated with the corresponding indexable mount in a first horizontal position for holding a parison or a second position enabling free fall of the parison, so that, when one of the parison molds is in the transfer position, the indexable mount can be operated to move it from the first horizontal position into the second position, whereby the parison held in it drops into the associated press mold for pressing by its associated press tool into its final form.

In a preferred embodiment of the device the first rotary indexing table meshes with the second rotary indexing table so that the parison molds can be moved into their transfer positions by pivoting or rotatably shifting the first rotary indexing table.

In a further variant, the parison mold preform experiences an acceleration of at least 1 g, that is, the acceleration due to gravity, in executing the pivoting motion. In pictorial terms, the parison mold preform must be folded away faster than the glass gob or parison moves along its way in free fall to the pressing mold. As a result, the parison or glass gob reaches the press pressing mold without tilting of the parison mold preform.

An embodiment, in which the parison molds preforms are pivotably connected to the indexable mounts and can be pivoted downward upon actuation of their actuators, an actuator is especially preferred. This embodiment makes the variant method possible in which the parison molds preforms are pivoted away from the glass gob. The pivoting angle should be at least 90°.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
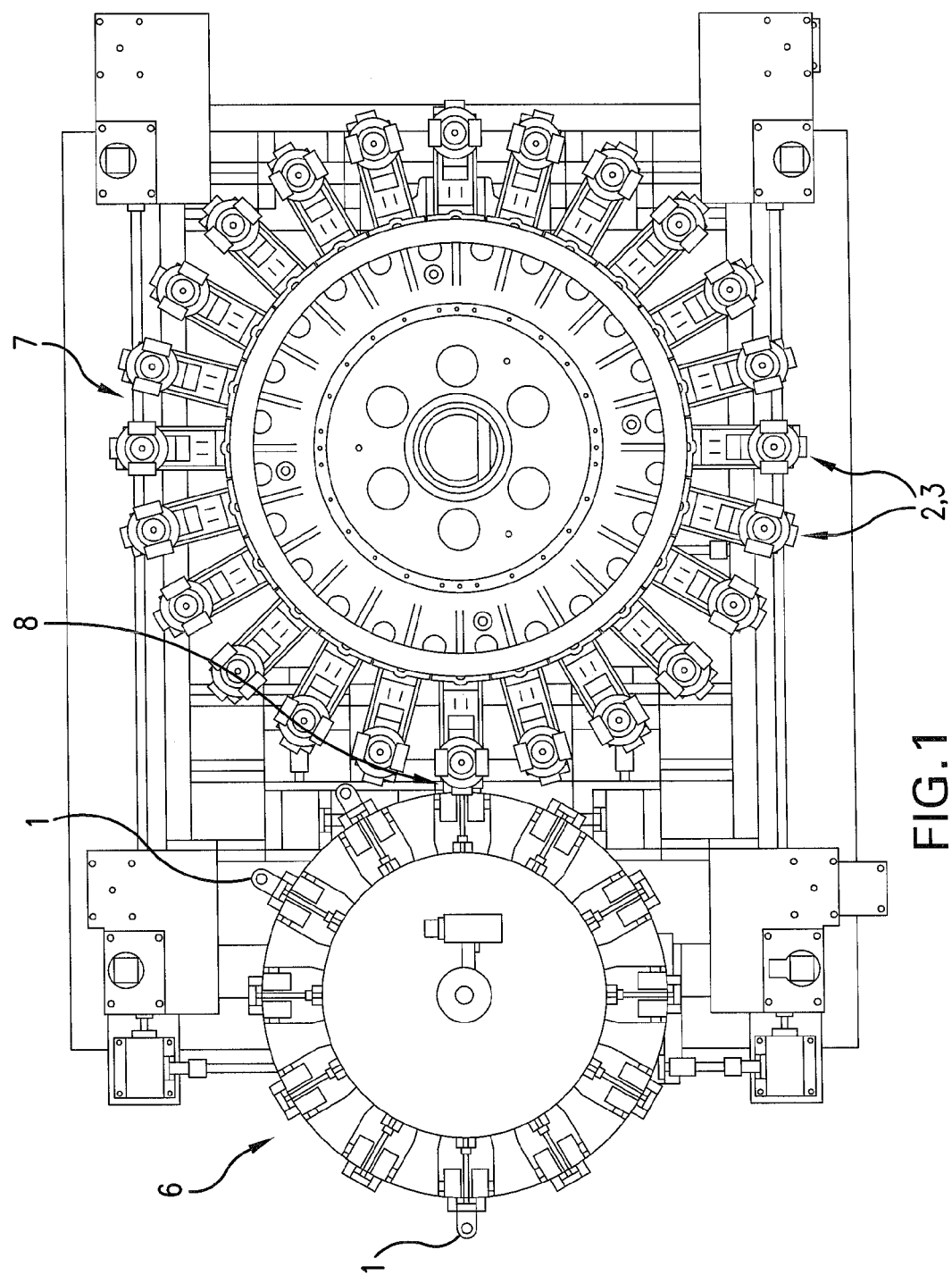
FIG. 1 is a plan view showing the basic arrangement of the two rotary indexing tables of the device for blank pressing optical glass bodies according to the invention.

Below, identical reference numerals designate the same elements.

FIG. 1 provides a first overview of the disposition of the various components. Two cooperating rotary indexing tables 6 and 7 are shown in FIG. 1. They are disposed such that they mesh with one another in a transfer position 8. The first rotary indexing table 6 has the parison molds performs 1 arranged in a circle for forming the parisons. The second larger rotary indexing table 7, conversely, has press pressing molds 2 and press pressing tools 3 arranged in a circle for pressing the parisons. It can be seen that the second rotary indexing table 7 for the press pressing molds 2 has more positions than the first rotary indexing table 6 for the parison molds preforms. This is predominantly due to the fact that each pressing die (not shown) of each press pressing tool 3 has its own separate drive mechanism. This means that the press pressing tool can be moved simultaneously while the pressing continues. Thus longer pressing times in proportion to the feeding times are attained by greater mechanical effort.

Figure 2:
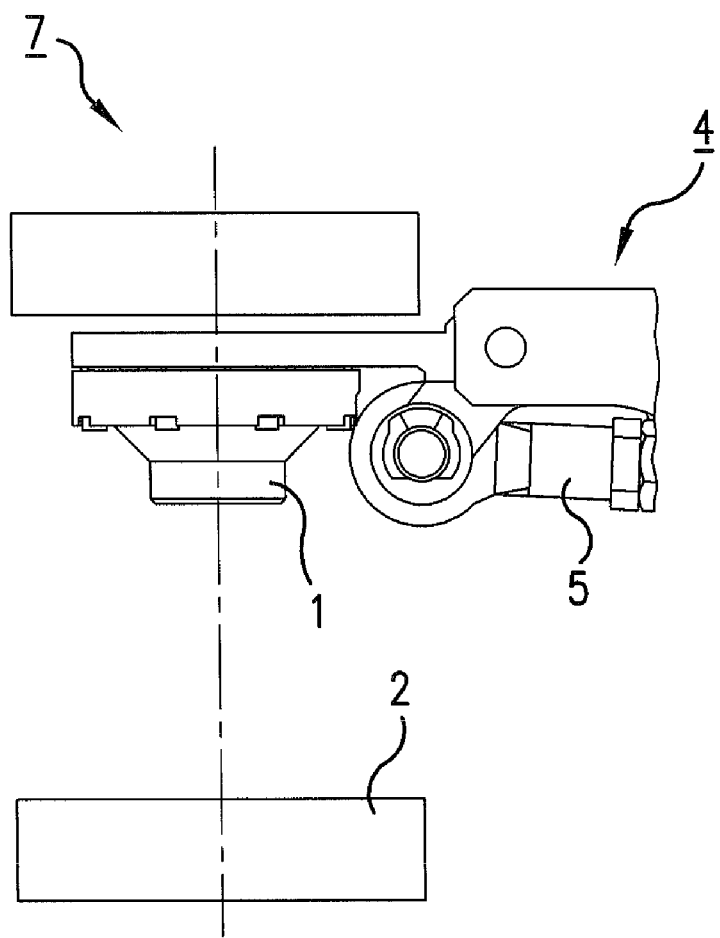
FIG. 2 is a diagrammatic side view showing a parison mold the preform in relation to the press pressing mold prior to the free fall of the parison glass gob.

FIG. 2 now shows the cooperation of the rotary indexing tables 6 and 7. FIG. 2 shows how after a further cycle, the parison mold preformer has moved into the region between the press pressing tool 3 and the press pressing mold 2. The parison mold preform 1 is still located in a horizontal position on the indexable mount 4.

Figure 3:
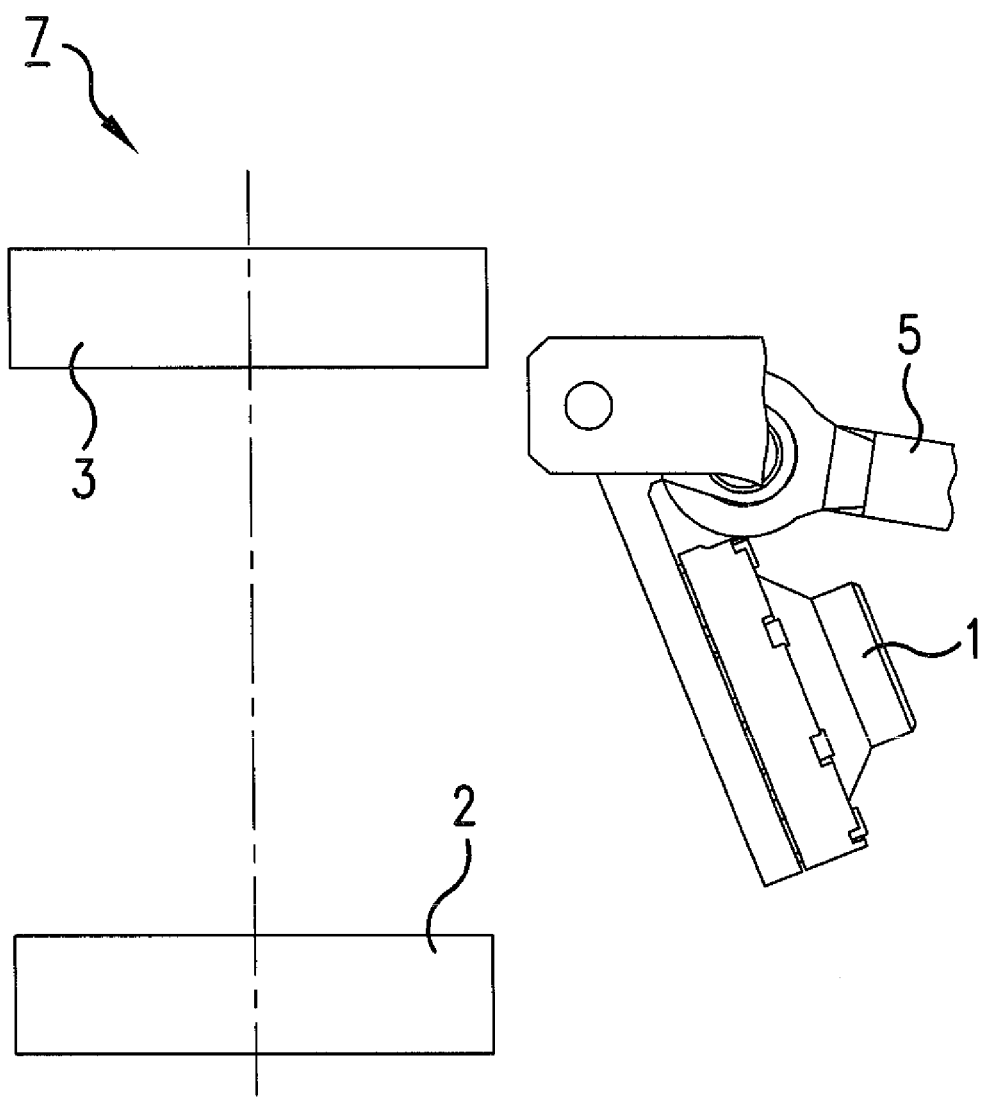
FIG. 3 is a diagrammatic side view showing the arrangement of FIG. 2 after the free fall of the parison glass gob into the pressing mold.

After a defined length of time, the actuator 5 of the indexable mount 4 is actuated, specifically in such a way that the parison mold preform 1 is moved into the pivoted-away position, as shown in FIG. 3, with an acceleration that is greater than the acceleration due to gravity. The pivoting motion causes the glass gob, or parison (not shown), to fall freely into the press pressing mold 2. The press pressing mold 2 is then moved upward. In the process, it presses the parison into the final product.

The invention claimed is:

1. A device for performing a process for producing blank-pressed glass bodies for optical equipment according to pre-shaping technology, said process comprising feeding a molten glass gob to a levitation parison mold (1), preshaping the glass gob to form a parison without touching any surface of the parison mold (1), transferring the parison to a separate press mold (2), and pressing the parison to a final form in the press mold (2) with a press tool (3) adapted for pressing the parison in the press mold, said transferring taking place so that said parison freely drops from the parison mold (1) into the press mold (2) by positioning the parison mold (1) over the press mold (2) in a transfer position and then pivoting the parison mold (1) downward and away from the parison;

said device comprising two rotary indexing tables (6, 7), one of which has a plurality of parison molds (1) in a circular arrangement thereon, each of which are provided with openings in a lower region thereof through which air is fed to form an air cushion for levitating the glass gob and the parison formed therefrom, and another of which has a plurality of press molds (2) in a circular arrangement thereon and a plurality of press tools (3) arranged to cooperate with said press molds to form said blank-pressed glass bodies;

in which said parison molds (1) are held in said one of said two indexing tables (6, 7) by indexable mounts (4), each of which is switchable between a horizontal position in which one of said parison molds (1) is held in said horizontal position over one of the press molds (2) and another position in which the parison held in said one of said parison molds freely drops into an associated one of the press molds (2) of said another of said two indexing tables (6, 7).

2. The device as defined in claim 1, wherein the indexable mounts (4) comprise actuators (5) for pivoting the parison molds (1) downward and away from the horizontal position to said another position.

3. The device as defined in claim 2, wherein the actuators (5) comprise means for pivoting the parison molds through a pivoting angle of at least 90°.

4. The device as defined in claim 2, wherein said parison mold (1) experiences an acceleration of at least 1 g during said downwardly pivoting.

5. A device for blank-pressing glass bodies for optical equipment according to preshaping technology, said device comprising a first rotary indexing table (6) comprising a plurality of levitation parison molds (1) in a circular arrangement thereon, each of said levitation parison molds (1) comprising means for molding a respective molten glass gob supplied thereto into a corresponding parison and having a lower region provided with a plurality of openings for forming an air cushion so that said molten glass gob and said parison formed therefrom do not contact any parison mold surfaces; and a second rotary indexing table (7) comprising a plurality of respective press molds (2) and corresponding press tools (3) arranged in a circular arrangement thereon, each of said press tools (3) being adapted to cooperate with an associated one of said respective press molds (2) for pressing said parison into a final form after formation and transfer of said parison thereto;

in which said first rotary indexing table (6) meshes with said second rotary indexing table (7) and is moveable relative to said second rotary indexing table (7) into at least one transfer position (8) in which one of said parison molds (1) is positioned between one of said press tools (3) and said associated one of said press molds (2); and in which said one of said parison molds (1) is pivotably mounted on the first rotary indexing table (6) on a respective indexable mount (4) provided with an actuator (5) for pivoting said one of said parison molds (1), so that, when said first rotary indexing table (6) is in said at least one transfer position (8), said one of said parison molds (1) is pivotable by said actuator from a horizontal position in which said parison is held in said one of said parison molds (1) downward to a downwardly pivoted position in which said one of said parison molds is no longer positioned between said one of said press molds (2) and said one of said press tools (3) so that during the pivoting of said one of said parison molds (1) said parison held in said one of said parison molds (1) drops in free fall into said one of said press mold (2) for pressing into said final form by said one of said press tools (3).

6. The device as defined in claim 5, wherein said one of said parison molds (1) is pivoted downward from the horizontal position to the downwardly pivoted position through an angle of at least 90°.

7. The device as defined in claim 5, wherein said one of said parison molds (1) experiences an acceleration of at least one g when moved between said horizontal position and said downwardly pivoted position enabling said free fall.

* * * * *